(12) United States Patent  (10) Patent No.: US 9,286,705 B1
Haught et al.  (45) Date of Patent: *Mar. 15, 2016

(54) PRESENTING WIRELESS-TELECOMMUNICATIONS COVERAGE AREAS

(71) Applicant: Sprint Communications Company L.P., Overland Park, KS (US)

(72) Inventors: Rickey Jack Haught, Lawrence, KS (US); John Patrick Kullman, Olathe, KS (US); Mark Anthony Martin, Littleton, CO (US); Scott D. Boxberger, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 388 days.

This patent is subject to a terminal disclaimer.

(21) Appl. No.: 13/681,705

(22) Filed: Nov. 20, 2012

Related U.S. Application Data

(63) Continuation of application No. 12/475,906, filed on Jun. 1, 2009, now Pat. No. 8,355,600.

(51) Int. Cl.
*G06T 11/60* (2006.01)

(52) U.S. Cl.
CPC ...................... *G06T 11/60* (2013.01)

(58) Field of Classification Search
None
See application file for complete search history.

(56) References Cited

U.S. PATENT DOCUMENTS

| | | | |
|---|---|---|---|
| 7,085,550 B1* | 8/2006 | Echols, Jr. et al. | 455/403 |
| 7,174,152 B1* | 2/2007 | Oleniczak et al. | 455/404.1 |
| 7,324,820 B2* | 1/2008 | Rhemtulla et al. | 455/452.2 |
| 8,285,310 B1* | 10/2012 | Shrum, Jr. | H04W 48/18 370/338 |
| 8,355,600 B1* | 1/2013 | Haught et al. | 382/294 |
| 2003/0083073 A1* | 5/2003 | Cossins et al. | 455/446 |
| 2004/0260720 A1* | 12/2004 | Cossins et al. | 707/102 |
| 2005/0004944 A1* | 1/2005 | Cossins et al. | 707/104.1 |
| 2005/0004945 A1* | 1/2005 | Cossins et al. | 707/104.1 |
| 2006/0068805 A1* | 3/2006 | Rhemtulla et al. | 455/452.2 |
| 2009/0055719 A1* | 2/2009 | Cossins et al. | 715/204 |
| 2009/0287961 A1* | 11/2009 | Austin | 714/37 |

* cited by examiner

*Primary Examiner* — Bernard Krasnic

(57) ABSTRACT

Systems, methods, and computer-readable media for displaying an area of wireless-telecommunications coverage of a geographic region by a plurality of images is provided. In embodiments, an image representing an amount of wireless-telecommunications coverage for a geographic region is referenced. A plurality of image data points, including corners, is mapped to real-world geographic coordinates to create a registered image. A plurality of colors, each representing a different wireless-telecommunications coverage area, is identified. A second image is created that includes only pixels associated with selected colors and, thus, only represents the wireless-telecommunications coverage areas associated with the selected colors.

18 Claims, 10 Drawing Sheets

500

```
MO.TAB - NOTEPAD
FILE  EDIT  FORMAT  VIEW  HELP
!TABLE
!VERSION 300
!CHARSET WINDOWSLATIN

DEFINITION TABLE
   FILE "MO.BMP
   TYPE "RASTER"
   (0,1) (0,0) LABEL "PT 1", ~505
   (1,1) (1,0) LABEL "PT 2", ~506
   (0,0) (0,1) LABEL "PT 3", ~507
   COORDSYS NONEARTH UNITS "FT"
   UNITS "FT"
```

*FIG. 5.*

PRESENTING WIRELESS-TELECOMMUNICATIONS COVERAGE AREAS

CROSS-REFERENCE TO RELATED APPLICATIONS

This application is a continuation of U.S. patent application Ser. No. 12/475,906, filed Jun. 1, 2009, which is herein incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, an ability for displaying an area of wireless telecommunications coverage ("WTC") of a geographic region by a plurality of images.

BRIEF DESCRIPTION OF THE SEVERAL VIEWS OF THE DRAWING

Illustrative embodiments of the present invention are described in detail below with reference to the attached drawing figures, and wherein:

FIG. 5 depicts an illustrative table in accordance with an embodiment of the present invention;

DETAILED DESCRIPTION

Figure 1:
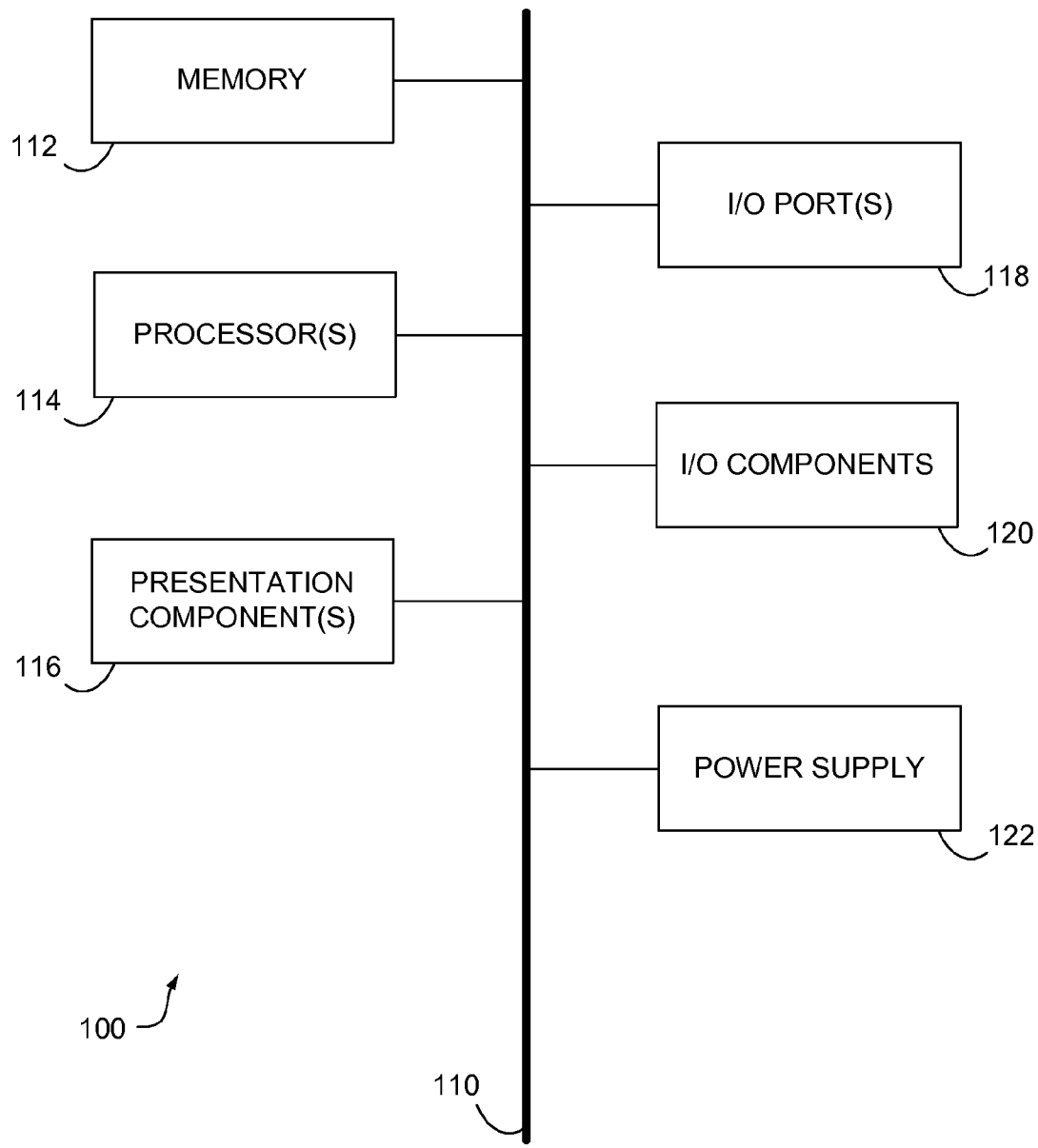
FIG. 1 depicts a block diagram of an exemplary computing device suitable for implementing an embodiment of the present invention.

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated embodiments. These acronyms and shorthand notations are solely intended for the purpose of providing an easy methodology of communicating the ideas expressed herein and are in no way meant to limit the scope of the present invention. The following is a list of these acronyms:

CD-ROM Compact Disk Read Only Memory
DVD Digital Versatile Discs
EEPROM Electrically Erasable Programmable Read Only Memory
GIS Geographic Information System
IP Internet Protocol
LAN Local Area Network
PC Personal Computer
PDA Personal Digital Assistant
RAM Random Access Memory
ROM Read Only Memory
WAN Wide Area Network
WTC Wireless-Telecommunications Coverage Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention provide computer-implemented systems and computer-readable media for performing a method for displaying an area of WTC of a geographic region by a plurality of images. In one embodiment, computer-readable media having computer-executable instructions embodied thereon that, when executed, perform a method for displaying an area of WTC of a geographic region by a plurality of images is described. A first image having a first corner and a second corner is referenced. The first image includes a first set of colored pixels that are a first color that depict a first area of WTC in the geographic region and a second set of colored pixels that are a second color and depict a second area of WTC in the geographic region. A computing device is used to register the first image with a real-world physical location by respectively associating the first and second corners with a first set and a second set of real-world geographic coordinates. The first and second colors are identified. A second image is created that depicts a single WTC area corresponding to either the first area of WTC or the second area of WTC, but not both. The single WTC area is colored consistently with the first or second color. The second image is presented on a display device that is coupled to the computing device.

In another embodiment, computer-readable media having computer-executable instructions embodied thereon that, when executed, perform a method for displaying an area of WTC of a geographic region by a plurality of images is described. A first image having a first corner and a second corner and representing an amount of WTC is referenced. The first image includes a first set of colored pixels that are a first color that depict a first area of WTC in the geographic region and a second set of colored pixels that are a second color that depict a second area of WTC in the geographic region. A computing device is used to register the first image with a real-world physical location to obtain an image perimeter. Registering the image includes associating the first corner with a first set of real-world geographic coordinates, associating a second corner with a second set of real-world geographic coordinates, and creating a registered image. A first pixel within the first set of colored pixels is identified. The first pixel is the first color and is associated with a first pixel location that is a real-world geographic coordinate. Using the first pixel location and the image perimeter, a first pixel area is calculated. The first pixel is the center of the first pixel area. A plurality of first pixel area perimeter points are determined based on the first pixel area. The calculations are repeated for each pixel included in the first image. A second image is created that depicts a single WTC area that is either the first set of colored pixels or the second set of colored pixels. Each pixel within the WTC area occupies the same pixel area in the second image as in the first image and the WTC area is colored consistently with the first or second color. The second image is presented on a display device that is coupled to the computing device.

In yet another embodiment, computer-readable media having computer-executable instructions embodied thereon that, when executed, perform a method for displaying an area of WTC of a first geographic region by a plurality of images is described. A computer is used to present at least two WTC areas within a first registered image that depicts the first geographic region. A first set of colored pixels that are a first color and depict a first WTC area is displayed in the first geographic region. A second set of colored pixels that are a second color and depict a second WTC area is also displayed in the first geographic region. A third set of colored pixels that are a third color are identified in the first geographic region. The third set of colored pixels are adjacent to the first set of colored pixels. The third set of colored pixels are associated with the first color such that the third set of colored pixels are the first color and depict the first WTC area. A second image is created that depicts only the first WTC area. The second image is presented on a display device that is coupled to the computer.

Having briefly described an overview of embodiments of the present invention, an exemplary computing device suitable for implementing various embodiments is described below in order to provide a general context for various aspects of the present invention.

Turning now to FIG. 1, a block diagram of an illustrative computing device is provided and referenced generally by the numeral 100. Although some components are shown in the singular, they may be plural. For example, computing device 100 may include multiple processors or multiple presentation components, etc. As illustratively shown, computing device 100 includes bus 110 that directly or indirectly couples various components together including memory 112, processor 114, presentation component 116, input/output (I/O) ports 118, I/O components 120, and power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art and reiterate that the diagram of FIG. 1 is merely illustrative of an exemplary mobile device that can be used in connection with one or more embodiments of the invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and include both volatile and nonvolatile media, removable and nonremovable media. By way of example, and not limitation, computer-readable media may include computer-storage media and communication media. Computer-storage media include both volatile and nonvolatile, removable and nonremovable media implemented in any method or technology for storage of information such as computer-readable instructions, data structures, program modules, or other data. Computer-storage media include, but are not limited to, Random-Access Memory (RAM), Read-Only Memory (ROM), Electrically-Erasable Programmable Read-Only Memory (EEPROM), flash memory or other memory technology, Compact Disk Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by mobile device 100.

Memory 112 includes computer-storage media in the form of volatile memory. Exemplary hardware devices include solid-state memory, such as RAM. Memory 112 includes computer-storage media in the form of nonvolatile memory. The memory 112 may be removable, non-removable, or a combination thereof. Exemplary hardware devices include solid-state memory, hard drives, optical-disc drives, etc. Computing device 100 includes processor 114 that reads data from various entities such as memory 112 or I/O components 120. Processor 114 might actually be multiple processors that receive instructions and process them accordingly. Presentation component 116 includes the likes of a display, a speaker, as well as other components that can present information (such as a lamp (LED), or even lighted keyboards).

I/O port 118 allows computing device 100 to be logically coupled to other devices including I/O components 120, some of which may be built in. I/O port 118 might take on a variety of forms. Illustrative I/O ports include a USB jack, stereo jack, infrared port, proprietary communications ports, and the like. I/O components 120 include items such as keyboards, microphones, touch screens, and any other item usable to directly or indirectly input data into computing device 100. Power supply 122 includes items such as batteries, fuel cells, or any other component that can act as a power source to power computing device 100.

Figure 2:
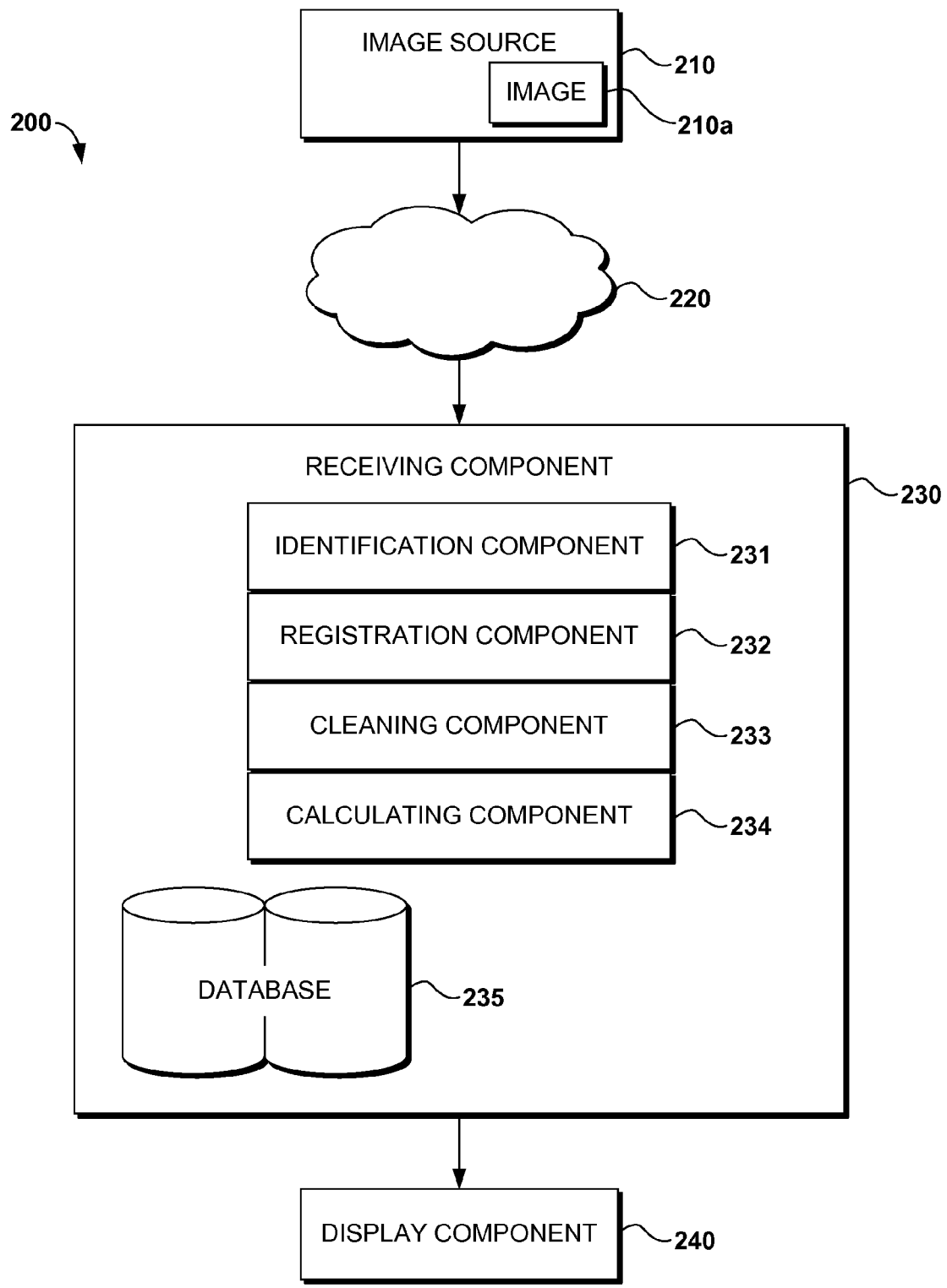
FIG. 2 depicts a block diagram of an exemplary operating system suitable for implementing an embodiment of the present invention.

Turning now to FIG. 2, an illustrative operating environment suitable for practicing an embodiment of the present invention is provided and referenced generally by the numeral 200. Operating environment 200 includes an image source 210. Image source 210 communicates an image 210a, such as a digital file or a photograph. An image source can be any computing device that is capable of communicating an image. As such, image source 210 may take on a variety of forms, such as a personal computer (PC), a laptop computer, a mobile phone, a personal digital assistant (PDA), a server, or any other device that is capable of communicating an image. Image source 210 communicates image 210a by way of a network, depicted generally by the numeral 220. Network 220 could be wired, wireless, or both. Network 220 can include multiple networks, as well as being a network of networks, but is shown in more simple form so as to not obscure other aspects of the present invention. For example, network 220 may include one or more wide area networks (WANs), one or more local area networks (LANs), one or more public networks, such as the Internet, and/or one or more private networks. Network 220 might include an array of devices, which are not shown so as to not obscure more relevant aspects of the invention. Although single components are illustrated for clarity, one skilled in the art will appreciate that network 220 can enable communication between multiple components of system 200.

Image source 210 may communicate image 210a in any format known to one skilled in the art. By way of example and not limitation, image 210a may be in the form of a bitmap image, a JPEG image, a TIFF image, or the like. Image 210a may be a standard 24-bit image, an 8-bit image, a 16-bit image, or the like. Embodiments of the present invention process images in standard 24-bit format while other embodiments may read an 8-bit image.

Figure 3:
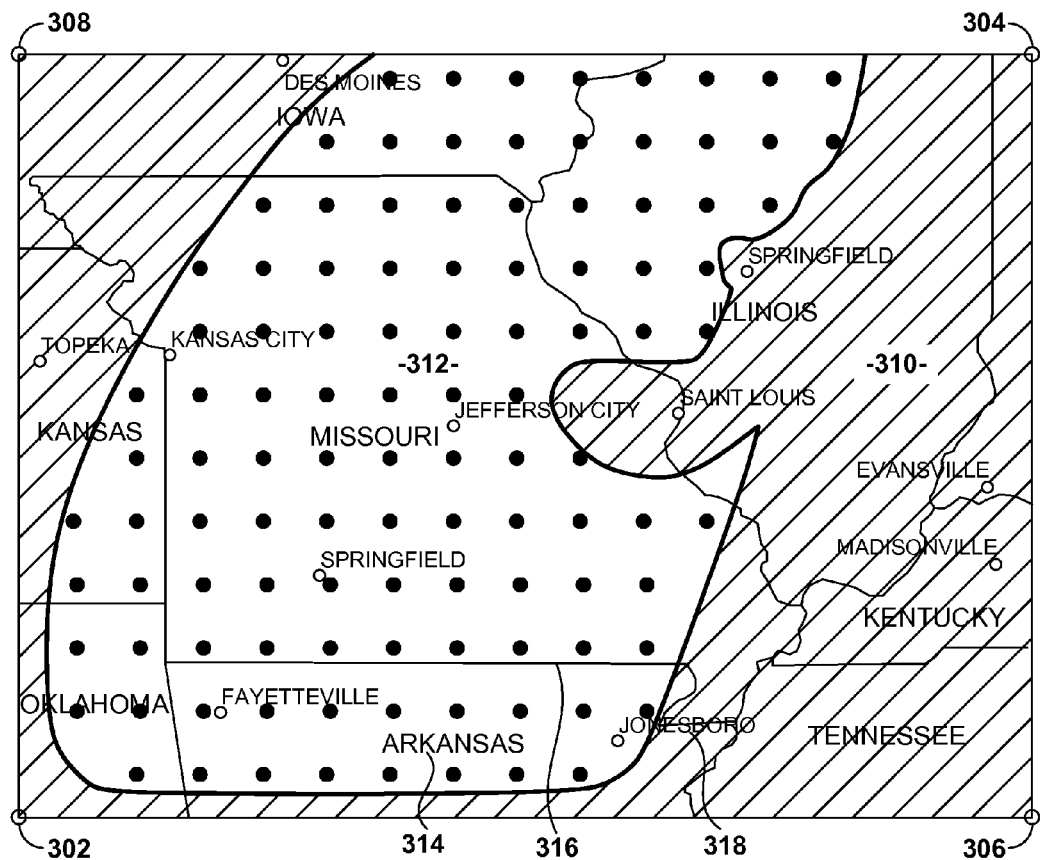
FIG. 3 depicts an illustrative image representing a plurality of wireless-telecommunications coverage areas in accordance with an embodiment of the present invention.

In embodiments, image 210a is representative of WTC areas of a geographic region. An illustrative image is shown in FIG. 3 and is discussed in further detail below. WTC areas are illustrations of an amount of WTC provided to a geographic region by various wireless-telecommunications providers. The service provided in a WTC area varies according to the geographic region. Typical services in a WTC area are voice network coverage, roaming coverage, and broadband coverage. Voice network coverage is basic wireless telecommunications service that wireless-telecommunications providers offer for a home network. Roaming coverage is WTC coverage that offers wireless-telecommunications service in a geographic region that is an extension of the home-network of the voice network coverage area. Broadband coverage is WTC that provides high data rate access to the Internet. WTC varies among wireless-telecommunications providers depending on the geographic region. WTC areas for different wireless-telecommunications service providers may overlap one another. For example, Provider A may offer voice network coverage in Region A, while Provider B may offer broadband coverage for Region A. The coverage from Provider A and Provider B overlap one another and illustrate the variations in WTC by providers. Additionally, the broadband coverage offered by Provider B may not be as expansive in Region A as the voice network coverage offered by Provider A.

Image source 210 communicates image 210a to a receiving component 230 via network 220. Receiving component 230 can be any device capable of receiving an image. As such, receiving component 230 may take on a variety of forms, such as a personal computer (PC), a laptop computer, a mobile phone, a personal digital assistant (PDA), a server, or any other device that is capable of receiving an image. Receiving component 230 may include identifying component 231, registering component 232, cleaning component 233, calculating component 234, and database 235.

Upon receiving image 210a, identifying component 231 identifies image 210a as a registered image or an unregistered image. A registered image is an image that has been associated with a real-world data point or location on earth, such as a geographic coordinate. An image is registered so that it is spatially input onto a map of a geographic region at the correct coordinates and does not appear skewed on the earth's surface. An unregistered image is an image that has not been associated with a real-life data point or location. In embodiments, unregistered images will be mapped to real-world geographic coordinates and converted to registered images by registering component 232. A geographic information system is an exemplary registering component. An exemplary GIS for registering images is Mapinfo®, offered by Pitney Bowes of Troy, N.Y.

Figure 4:
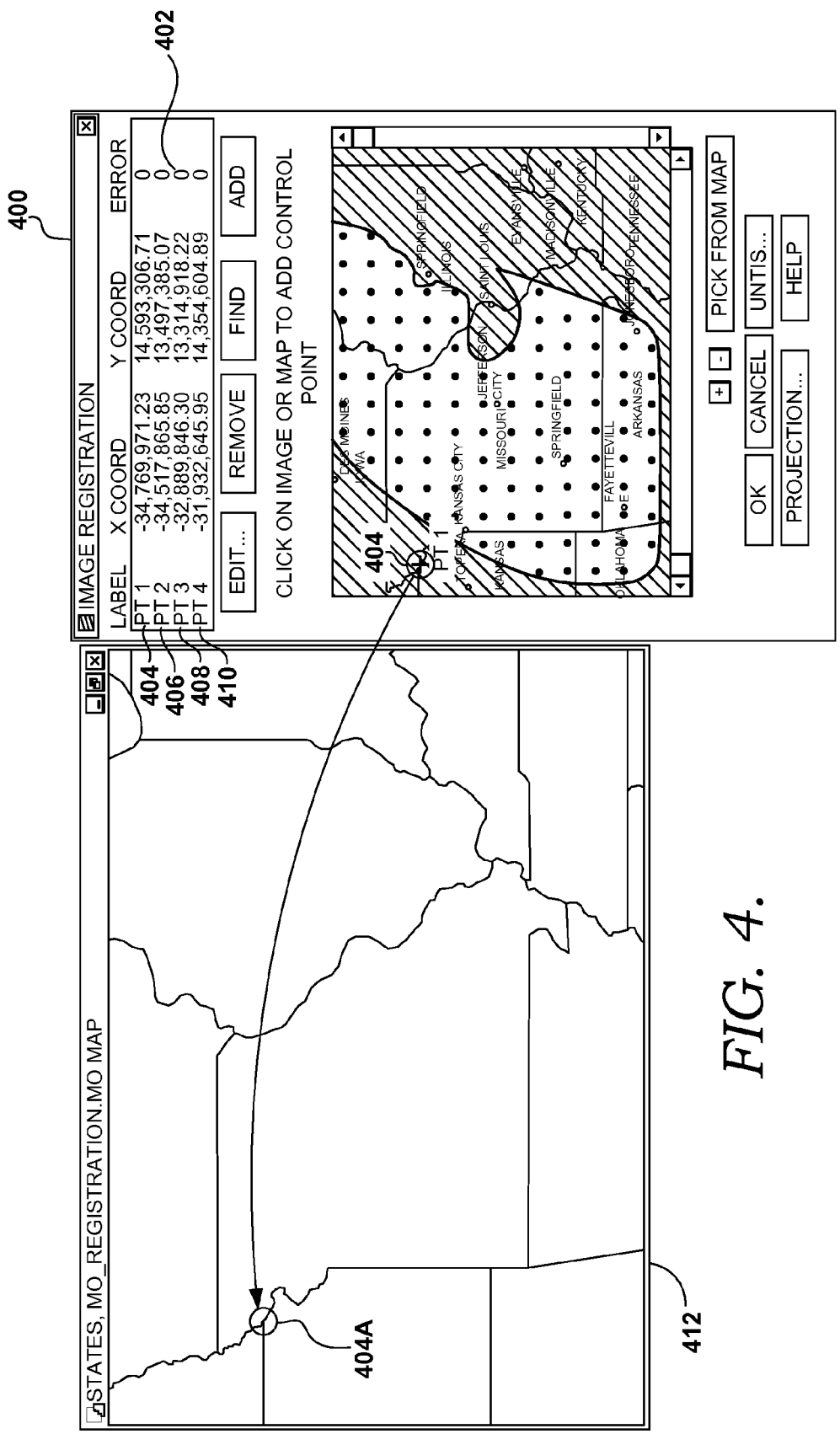
FIG. 4 depicts an illustrative screen shot of an image registration in accordance with an embodiment of the present invention.

Registering component 232 maps image 210a to real-world geographic coordinates. In an embodiment, a plurality of corners of an image are mapped to geographic coordinates. More particularly, the lower-left corner and the upper-right corner of an image are mapped to geographic coordinates. FIG. 3 illustrates a plurality of corners 302, 304, 306, and 308 that may be mapped to geographic coordinates. By mapping the opposing corners 302 and 304, it is possible to calculate the total size, or image perimeter, of an image. Alternatively, the upper-left corner 308 and lower-right corner 306 of the image may be mapped to real-world geographic coordinates to calculate the image perimeter. It is also within the scope of the invention to map various non-corner image points to real-world geographic coordinates. Thus, a non-corner image point could be mapped to real-world geographic coordinates. Data points that may be mapped to real-world geographic coordinates but are not corners of an image include state boundaries 316, roads (not shown), or the like. For example, state boundary 316 may be mapped to the real-world geographic coordinates of the state boundary, even though the state boundary 316 is not a corner of the image, as illustrated in FIG. 4. Point 404, a data point of a state boundary, is mapped to its real-world geographic coordinate shown as point 404a on a registration map 412. Registration map 412 illustrates a real-world geographic coordinate point 404a that corresponds to point 404. A user selects the data point to be mapped to its real-world geographic coordinate, in this case data point 404, and then selects the coordinate on the registration map 412. The user is able to track the accuracy of selections because of error illustrations 402 that display the amount of error in the mapping selection. In embodiments, the error for each registered point is zero in order to obtain a more accurate image fit. Additionally, to maximize accuracy, a minimum of four-point registration may be desired. Once registering component 232 has mapped the selected image points to real-world geographic coordinates, the image is a registered image.

Both registered and unregistered images are associated with tables that illustrate either geographic coordinates for image points of registered images or non-geographic coordinate image point information for unregistered images. A registered image is associated with a table that illustrates the geographic coordinates for the image data points that have been mapped to real-world geographic coordinates. Such a table 400 is shown in FIG. 4. FIG. 4 shows data points 404, 406, 408, and 410 for the registered image. Each of data points 404, 406, 408, and 410 are associated with real-world geographic coordinates shown as X and Y coordinates. The X and Y coordinates may be representative of latitude and longitude coordinates. The error for each data point 404, 406, 408, and 410 is also displayed in error illustration 402. Similarly, an unregistered image is associated with a table 500 that illustrates various points that are not mapped to real-world geographic coordinates as illustrated in FIG. 5. Various points 505, 506, and 507 are included with non-geographic coordinate data associated with the points. The coordinates, rather, are based on a non-earth coordinate system.

Figure 6:
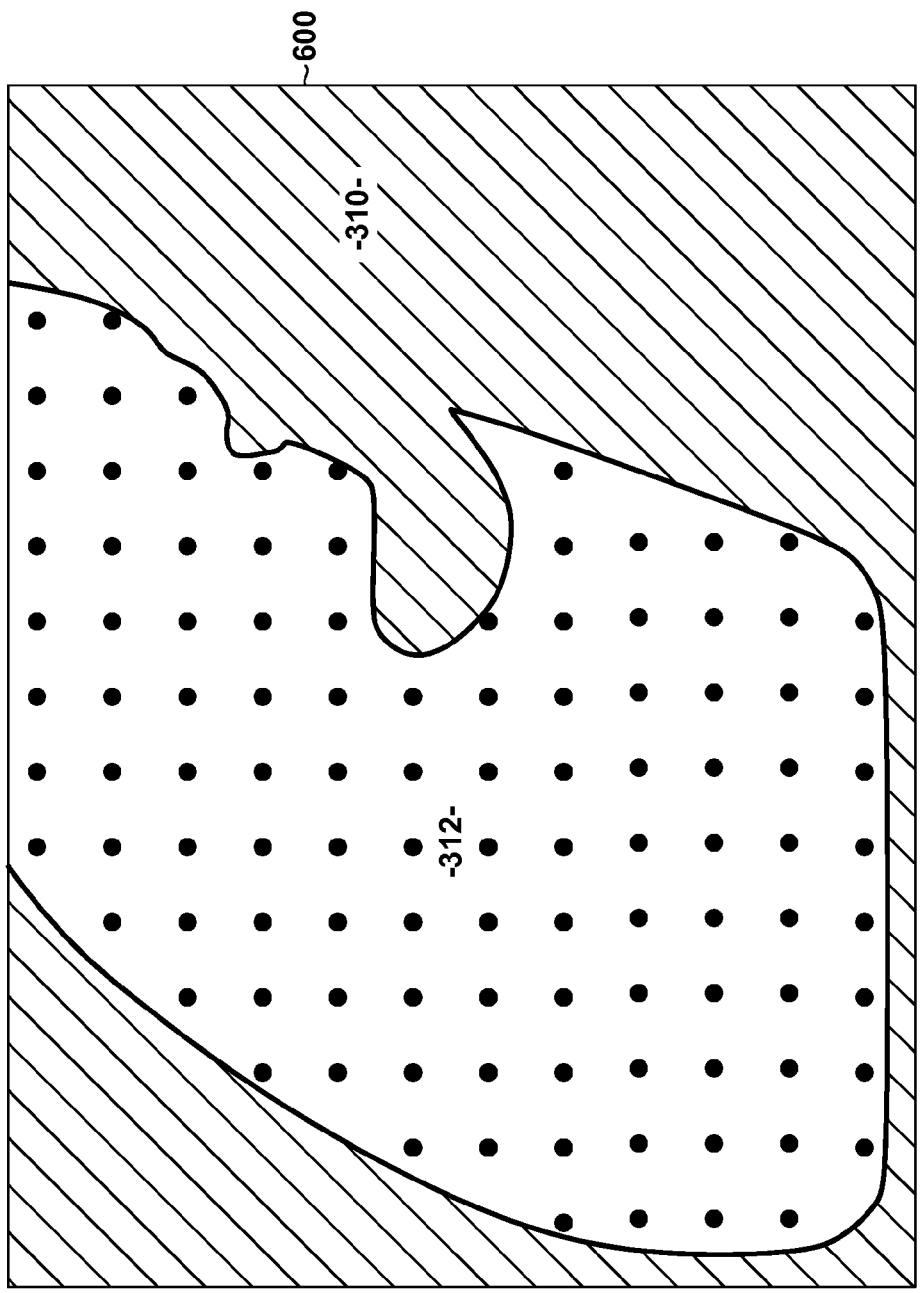
FIG. 6 depicts an illustrative clean image in accordance with an embodiment of the present invention.

In addition to identifying registered and unregistered images, identifying component 231 also identifies if image 210a is an unclean image or a clean image. An unclean image is an image that includes textual labels, such as city identifiers and state identifiers, indications of roads or highways, state boundaries, or the like, and is illustrated in FIG. 3. FIG. 3 illustrates first WTC area 310, second WTC area 312, state label 314, state boundary 316, and city label 318. Roads and highways may also be included in the image along with rivers, lakes, etc. An unclean image may be a registered image or an unregistered image. A clean image is an image that is free of textual labels, roads, boundaries, or the like, and is illustrated in FIG. 6 as clean image 600. The image is free of any labels, roads, boundaries, etc., and only includes first WTC area 310 and second WTC area 312.

Upon identifying an image as an unclean image, cleaning component 233 creates a clean image by removing text, labels, borders, etc. from the unclean image. An image can undergo the cleaning process at any time. However, it is not likely that the image will be a completely clean image prior to image registration since a user may need to view image data points in order to map the image data points to real-world geographic coordinates. It is, however, within the scope of the invention for a user to partially clean an image, register the image with the remaining data points, and then completely clean the image to create a clean image, as illustrated in FIG. 6.

Image 210a includes a plurality of pixels. Each pixel of image 210a is associated with a color. Each color represents a WTC area. For example, first WTC area 310 is associated with a different color than second WTC area 312. Thus, each WTC area is easily identified. Image 210a may include a plurality of colors. In order to manage the amount of colors, the colors may be standardized. For instance, assume first WTC area 310 is associated with a color that represents the first WTC area 310 as blue. The color spectrum includes various shades of blue. In order to simplify the number of colors included in image 210a, shades of blue that are related to the color that represents the first WTC area 310 are standardized to be associated with the color that represents the first WTC area 310. Colors are related if they are near in proximity, or adjacent, to the color at issue. For example, a shade of the color associated with first WTC area 310 that is adjacent to first WTC area 310 is related to the color associated with the first WTC area 310. In another embodiment, colors associated with any pixel may be associated with a different color. For instance, if a pixel associated with a color representing a first WTC area was adjacent to a small area associated with a random color that is not a shade of the color representing the first WTC area, the small area could still be associated with the color that surrounds it in order to clean up the area from stray colors. In another embodiment, shades of a color may be standardized to a single shade regardless of proximity to the other pixel. For example, all shades of blue in an image may be standardized even if the pixels that are the various shades of blue are spread throughout the entire image and not near one another at all.

Colors may be standardized based on the information stored in image tables or records. Color information for each pixel is stored in a table. A list of all colors within the image is presented and the colors are organized in the table such that they are presented in order of frequency. The colors that are least frequent within the image are grouped together and may be stray colors. The stray colors are identified along with the neighboring color. The stray color may be assigned to the color associated with the neighboring color. Such color assignment may be repeated for as many pixels as needed until a desired number of colors within the image is reached.

If not already, image 210a is imported into a geographic information system (GIS) that stores, analyzes, manages, and presents location-related data. An exemplary GIS is MapInfo®. To import the image, each pixel is read individually starting with the pixel located in the lower-left corner of the image. The pixels are associated with pixel location information and pixel color information. Using the pixel location information and the location of the registered corners of image 210a, the size of the pixel area, or pixel area perimeter points, is calculated by calculating component 234. For example, image header information will illustrate the number of rows and columns of pixels such that the exact number of pixels in the image is known. The pixel location and the location of the image perimeter, e.g., the image corners, is known. Assuming an image is 100 feet wide and 100 feet high with 100 rows of pixels and 100 columns of pixels, the pixel area is calculated to be 1 foot wide by 1 foot high. From there, the location of the pixel area perimeter points is calculated. Alternatively, the pixel area width may be calculated by subtracting the western longitude (W) from the eastern longitude (E) and dividing the result by the number of columns (Col). The pixel area height may be calculated by subtracting the south latitude (S) from the north latitude (N) and dividing the result by the number of rows (Row). The pixel is located at the center of the pixel area and the pixel latitudinal coordinates may be calculated as follows:

$$S+(Row-1)*Pixel\ Area\ Height$$

The pixel longitudinal coordinates may be calculated using the following formula:

$$W+(Col-1)*Pixel\ Area\ Width$$

The calculations are repeated for each pixel included in the image such that each pixel is associated with a table that identifies color information and pixel location information. The information to compile the tables and the resulting tables are stored in database 235.

The coordinates of the four corners of the pixel area are calculated and used to import image 210a into a GIS. Each pixel area is imported, along with the associated table, into a GIS. If not already, the image may be converted to a vector file such that the image is capable of being manipulated. Each vector file includes a plurality of vector images that are equated with the pixels previously discussed. For example, an image that includes 500 pixels would be mapped to a vector file including 500 vector images that correspond to the same data as the data for the 500 pixels. Thus, each vector image is associated with a color that represents a WTC area and each vector image is the center of a vector image area equal to the corresponding pixel area. Additionally, each vector image is associated with a table including the color associated with the vector image and the location information for the vector image.

The vector images are identified as being associated with a color and may be combined with other vector images. For instance, if one hundred vector images adjacent to one another are the same color, they may be combined to a single vector image such that only one record exists for the vector image information rather than the one hundred records that existed before the vector images were combined. Additionally, the colors may be standardized in the same manner as the standardization of pixels such that hundreds of hues are homogenized to a single color. For example, all variations of the color red may be homogenized to a single shade of red. The standardization of colors is important as a typical GIS will not store every color variation included in an image. Rather, the GIS will arbitrarily assign a color to the excess colors that cannot be stored. By standardizing the colors, you are able to assign a desired color to the excess colors that will not be stored. In an embodiment, the standardization of a color to a different color will be applied to the entire image, not just the selected area.

Figure 7:
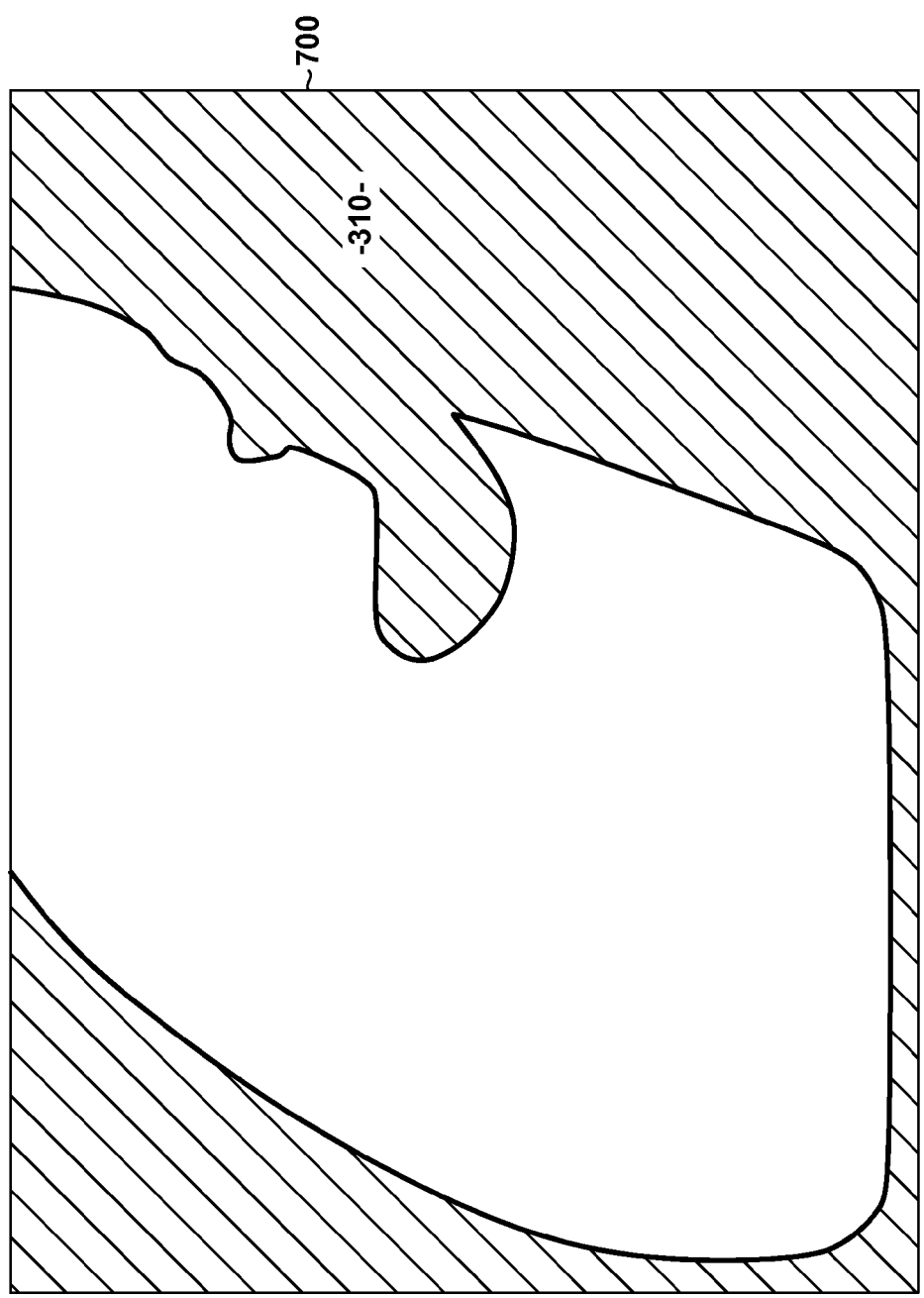
FIG. 7 depicts an illustrative image that includes a single WTC area in accordance with an embodiment of the present invention.

The vector images may be used to generate a second image that includes only WTC areas that are associated with a selected color. FIG. 7 illustrates an illustrative second image 700 including only selected colors such that only the first WTC area 310 is illustrated. To generate a second image, a user selection of a color is received. The selected color may be selected to create a second image representing a single WTC area, multiple WTC areas for a single wireless-telecommunications service provider, a comparison of multiple WTC areas for multiple wireless-telecommunications service providers, or the like. Once a color is selected, only the vector images associated with the selected color are included in the new image. Vector images associated with the selected color are included in the new image at once. For example, as briefly explained above, FIG. 7 illustrates only first WTC area 310. Second WTC area 312 is associated with a different color and, thus, is not included in the second image.

In embodiments, the second image may display more than one color or WTC area. For example, a color representing a WTC area for a wireless-telecommunications service provider in a given geographic region may be selected along with a color representing a WTC area for the same geographic region that is associated with a different wireless-telecommunications service provider. The two colors may be shown in the second image to analyze WTC areas among various wireless-telecommunications service providers. Display component 240 displays the newly generated image including only selected colors to the user such that only the WTC areas indicated by the user are presented. Such a display is desirable for analyzing WTC areas among various service providers. Overlaying competitor WTC areas is critical for analyzing one's own coverage area in relation to the coverage area of competitors. Thus, a competitor's WTC area for a given geographic region may be overlaid over another provider's WTC area for the same geographic region to compare wireless-telecommunications service.

The above-described process may be repeated with a plurality of images for a plurality of geographic regions such that the resulting imported images may be stitched together, or combined, to create a single image of a plurality of geographic regions.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Figure 8:
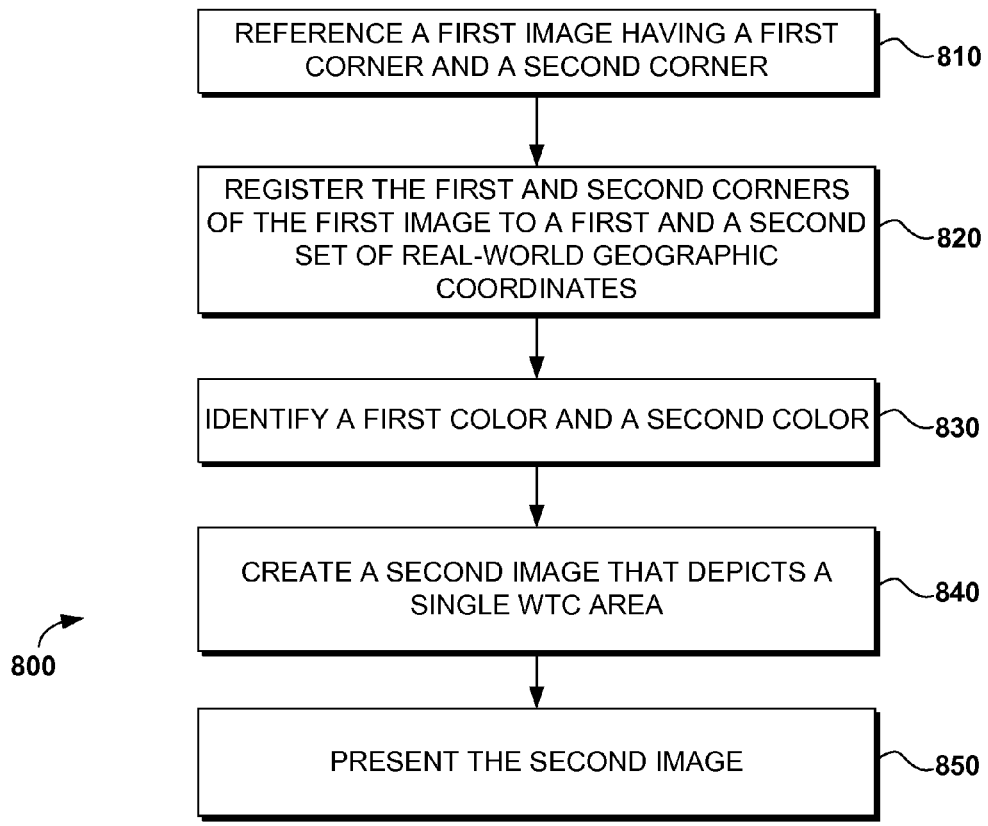
FIG. 8 depicts a first illustrative method for displaying an area of WTC of a geographic region by a plurality of images in accordance with an embodiment of the present invention.

A first exemplary method 800 for displaying an area of wireless-telecommunications coverage of a geographic area by a plurality of images is illustrated in FIG. 8. Initially, as indicated at step 810, a first image having a first corner and a second corner is referenced. The first image represents an amount of wireless-telecommunications coverage associated with a geographic region. A first set of colored pixels that are a first color that depict a first area of WTC in the geographic region are included in the first image. Also, a second set of colored pixels that are a second color that depict a second area of WTC in the geographic region are included in the first image. Once an image is referenced, the first and second corners of the first image are registered to a first and a second set of real-world geographic coordinates at step 820. In an embodiment, the lower-left corner and the upper-right corner may be registered and, in turn, the total size of the image may be calculated.

Once the image is registered, a first color and a second color are identified at step 830. Each WTC area is represented by a different color. For instance, a first WTC area is associated with a first color and a second WTC area is associated with a second color. A user may select one or more colors to be represented in a second image. A second image is created that depicts only a single WTC area at step 840. The single WTC area corresponds to either the first area of WTC or the second area of WTC. The second image is presented on a display device at step 850.

Figure 9:
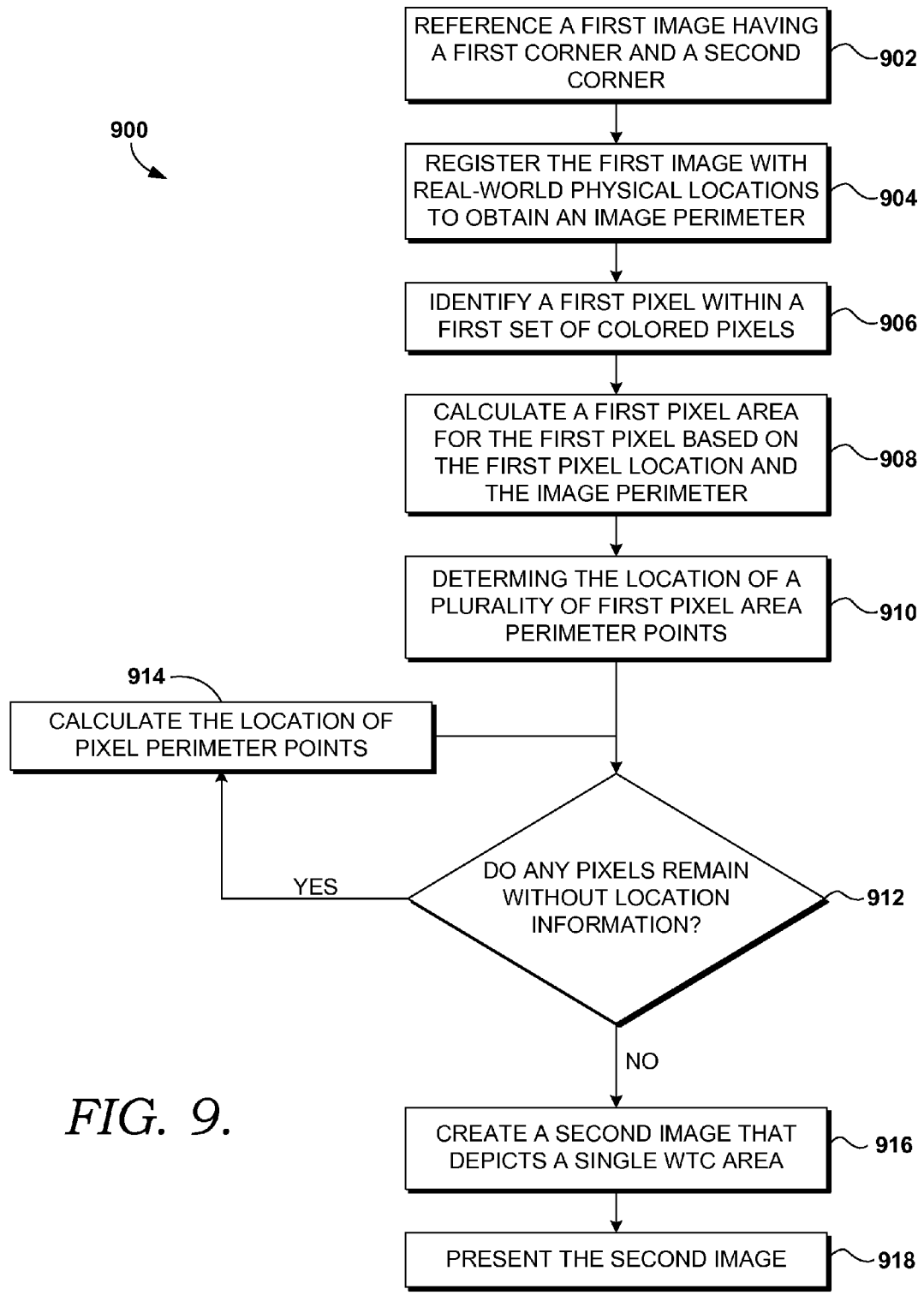
FIG. 9 depicts a second illustrative method for displaying an area of WTC of a geographic region by a plurality of images in accordance with an embodiment of the present invention.

A second exemplary method 900 for displaying an area of wireless-telecommunications coverage of a geographic area by a plurality of images is illustrated in FIG. 9. A first image having a first corner and a second corner is referenced at step 902. The first image is a representation of a plurality of WTC areas associated with a geographic region. The first image is registered with real-world physical locations at step 904 to obtain an image perimeter. The points of the first image that are registered may be the upper-right and lower-left corners or, alternatively, may be the upper-left and lower-right corners. By registering opposing corners, the total size of the image may be calculated with only two registered corners. The image perimeter is the edge of the image that is known by determining the location of the four corners of the image. The first image is registered by associating a first corner with a first real-world geographic coordinate and associating a second corner with a second real-world geographic coordinate.

A first pixel within a first set of colored pixels is identified at step 906. The first set of colored pixels is represented by a first color and all pixels within the first set of colored pixels are the first color. A first pixel area is calculated for the first pixel at step 908 based on the first pixel location and the image perimeter. The first pixel is located in the center of the first pixel area. At step 910, the location of a plurality of first pixel area perimeter points is determined. In other words, the corners of the first pixel area are determined in order to know the size of the first pixel area. A determination is made at step 912 as to whether any pixels remain that are not associated with a pixel location and a pixel area. Upon a determination that pixels remain that have not been associated with a pixel location and a pixel area, the pixel perimeter points for each pixel remaining are individually calculated at step 914. Upon a determination that all pixels are associated with a pixel location and a pixel area, a second image is created at step 916 that depicts a single WTC area. The single WTC area depicted is either the first set of colored pixels or the second set of colored pixels. The second image is presented at step 918.

Figure 10:
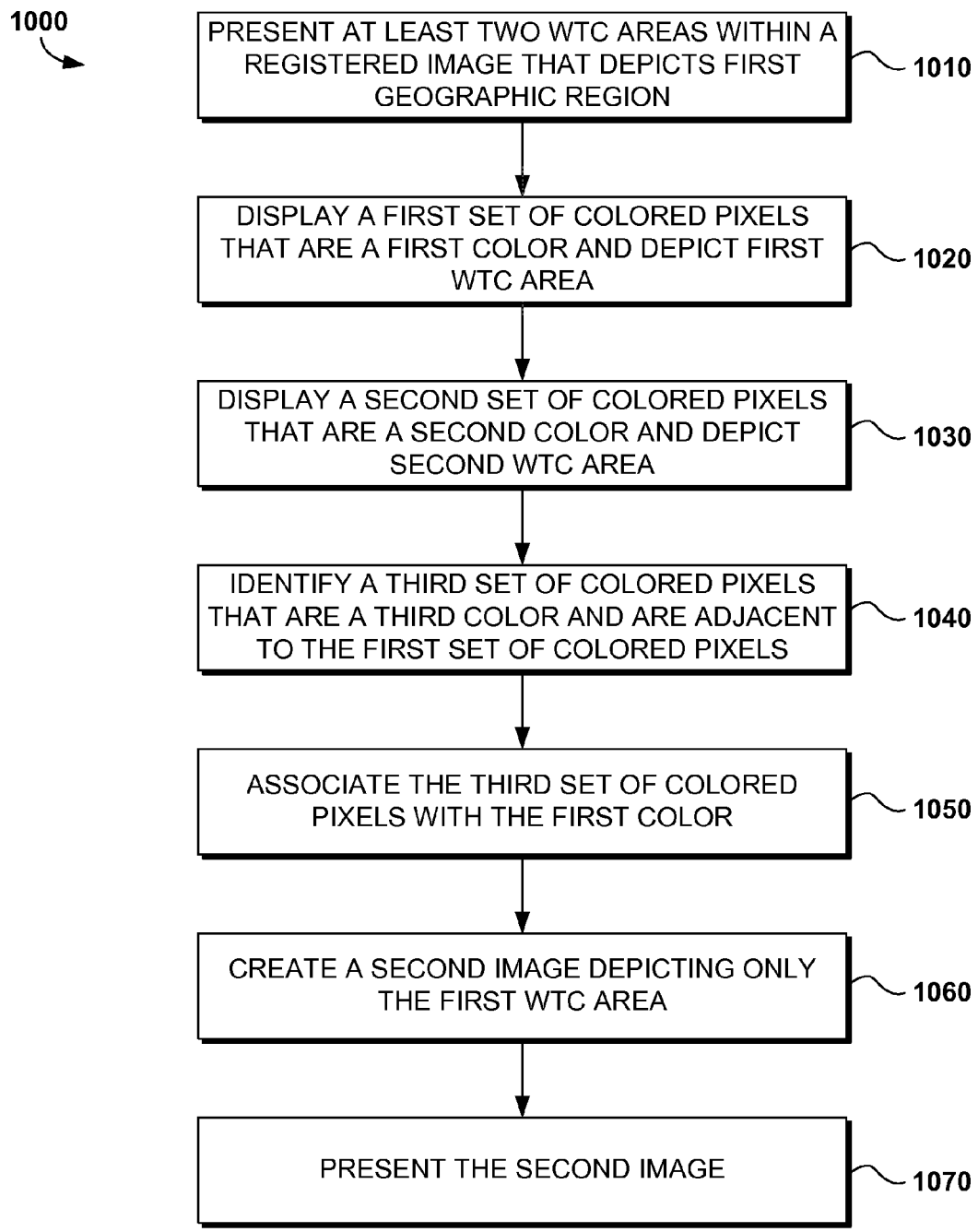
FIG. 10 depicts a third illustrative method for displaying an area of WTC of a geographic region by a plurality of images in accordance with an embodiment of the present invention.

A third exemplary method 1000 for displaying an area of WTC of a geographic region by a plurality of images is illustrated in FIG. 10. A computer is used to present at least two WTC areas within a registered image that depicts a first geographic region at step 1010. A first set of colored pixels that are a first color and depict a first WTC area is displayed at step 1020. A second set of colored pixels that are a second color and depict a second WTC area is displayed at step 1030. A third set of colored pixels that are a third color and are adjacent to the first set of colored pixels is identified at step 1040. The third set of colored pixels is associated with the first color identifier at step 1050. This standardization of colors proves effective in homogenizing the variations of different colors included in the registered image. As a result, the number of colors for a given image is homogenized and there are fewer colors to store. A second image is created at step 1060 that depicts only the first WTC area. Thus, only the first WTC area is presented at step 1070. Alternatively, a second image could have been created that displays only pixels associated with the second WTC area.

Additionally, a fourth set of colored pixels that are a fourth color may also be depicted in the first image. The fourth set of colored pixels may be a fourth WTC area of a different provider than the service provider associated with the first WTC area. The fourth WTC area could overlay the first WTC area in the second image. Thus, the WTC areas presented in the second image could be a comparison of WTC areas from different service providers.

From the foregoing, it will be seen that this invention is one well adapted to attain all the ends and objectives hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. One or more nontransitory computer-readable media having computer-executable instructions embodied thereon that, when executed, perform a method for displaying an area of wireless-telecommunications coverage (WTC) of a geographic region by a plurality of images, the method comprising:
    referencing a first image having a first corner and a second corner, wherein the first image includes,
    (a) a first set of colored pixels that are a first color that depict a first area of WTC where coverage is offered in said geographic region, wherein each pixel in the first set of colored pixels corresponds to a respective geographic location within the first area of WTC in said geographic region, and wherein the first color identifies the first area of WTC where coverage is offered, and
    (b) a second set of colored pixels that are a second color that depict a second area of WTC where coverage is offered in said geographic region, wherein each pixel in the second set of colored pixels corresponds to a respective geographic location within the second area of WTC in said geographic region, wherein the second color identifies the second area of WTC where coverage is offered, and wherein the first color which identifies the first area of WTC is a different color than the second color which identifies the second area of WTC, wherein the second area of WTC that is identified by the second color is associated with a different wireless telecommunications provider than the first area of WTC that is identified by the first color;
    utilizing a computing device to register said first image with a real-world physical location by respectively associating said first and second corners with a first set and a second set of real-world geographic coordinates, thereby creating a registered image;
    identifying said first color;
    identifying said second color;
    creating a second image that depicts a single WTC area, wherein said single WTC area corresponds to either the first area of WTC or the second area of WTC, but not both, wherein when said single WTC area corresponds to the first area of WTC, said single WTC area is determined based on the respective geographic locations of pixels in the first image that are the first color, wherein when said single WTC area corresponds to the second area of WTC, said single WTC area is determined based on the respective geographic locations of pixels in the first image that are the second color, and wherein said single WTC area is colored consistently with said first or second color; and
    presenting said second image on a display device that is coupled to said computing device.

2. The one or more nontransitory computer-readable media of claim 1, wherein said area of WTC includes voice network coverage, roaming coverage, or broadband coverage.

3. The one or more nontransitory computer-readable media of claim 1, wherein said first corner is a lower-left corner of said first image.

4. The one or more nontransitory computer-readable media of claim 1, wherein said second corner is an upper-right corner of said first image.

5. The one or more nontransitory computer-readable media of claim 1, wherein said registered image further includes at least one registered point that is not a corner of said first image.

6. The one or more nontransitory computer-readable media of claim 1, wherein the second area of WTC that is identified by the second color is a different area of WTC than the first area of WTC that is identified by the first color.

7. A method for displaying an area of wireless-telecommunications coverage (WTC) of a geographic region by a plurality of images, the method comprising:
    referencing a first image having a first corner and a second corner, wherein the first image includes,
    (a) a first set of colored pixels that are a first color that depict a first area of WTC where coverage is offered in said geographic region, wherein each pixel in the first set of colored pixels corresponds to a respective geographic location within the first area of WTC in said geographic region, and wherein the first color identifies the first area of WTC where coverage is offered, and
    (b) a second set of colored pixels that are a second color that depict a second area of WTC where coverage is offered in said geographic region, wherein each pixel in the second set of colored pixels corresponds to a respective geographic location within the second area of WTC in said geographic region, wherein the second color identifies the second area of WTC where coverage is offered, and wherein the first color which identifies the first area of WTC is a different color than the second color which identifies the second area of WTC, wherein the second area of WTC that is identified by the second color is associated with a different wireless telecommunications provider than the first area of WTC that is identified by the first color;
    utilizing a computing device to register said first image with a real-world physical location by respectively associating said first and second corners with a first set and a second set of real-world geographic coordinates, thereby creating a registered image;
identifying said first color;
identifying said second color;
creating a second image that depicts a single WTC area, wherein said single WTC area corresponds to either the first area of WTC or the second area of WTC, but not both, wherein when said single WTC area corresponds to the first area of WTC, said single WTC area is determined based on the respective geographic locations of pixels in the first image that are the first color, wherein when said single WTC area corresponds to the second area of WTC, said single WTC area is determined based on the respective geographic locations of pixels in the first image that are the second color, and wherein said single WTC area is colored consistently with said first or second color; and
presenting said second image on a display device that is coupled to said computing device.

8. The method of claim 7, wherein said area of WTC includes voice network coverage, roaming coverage, or broadband coverage.

9. The method of claim 7, wherein said first corner is a lower-left corner of said first image.

10. The method of claim 7, wherein said second corner is an upper-right corner of said first image.

11. The method of claim 7, wherein said registered image further includes at least one registered point that is not a corner of said first image.

12. The method of claim 7, wherein the second area of WTC that is identified by the second color is a different area of WTC than the first area of WTC that is identified by the first color.

13. A system for displaying an area of wireless-telecommunications coverage (WTC) of a geographic region by a plurality of images, comprising:
one or more processors configured to
A) reference a first image having a first corner and a second corner, wherein the first image includes,
1) a first set of colored pixels that are a first color that depict a first area of WTC where coverage is offered in said geographic region, wherein each pixel in the first set of colored pixels corresponds to a respective geographic location within the first area of WTC in said geographic region, and wherein the first color identifies the first area of WTC where coverage is offered, and
2) a second set of colored pixels that are a second color that depict a second area of WTC where coverage is offered in said geographic region, wherein each pixel in the second set of colored pixels corresponds to a respective geographic location within the second area of WTC in said geographic region, wherein the second color identifies the second area of WTC where coverage is offered, and wherein the first color which identifies the first area of WTC is a different color than the second color which identifies the second area of WTC, wherein the second area of WTC that is identified by the second color is associated with a different wireless telecommunications provider than the first area of WTC that is identified by the first color;
B) utilize a computing device to register said first image with a real-world physical location by respectively associating said first and second corners with a first set and a second set of real-world geographic coordinates, thereby creating a registered image;
C) identify said first color;
D) identify said second color;
E) create a second image that depicts a single WTC area, wherein said single WTC area corresponds to either the first area of WTC or the second area of WTC, but not both, wherein when said single WTC area corresponds to the first area of WTC, said single WTC area is determined based on the respective geographic locations of pixels in the first image that are the first color, wherein when said single WTC area corresponds to the second area of WTC, said single WTC area is determined based on the respective geographic locations of pixels in the first image that are the second color, and wherein said single WTC area is colored consistently with said first or second color; and
a display device configured to present said second image.

14. The system of claim 13, wherein said area of WTC includes voice network coverage, roaming coverage, or broadband coverage.

15. The system of claim 13, wherein said first corner is a lower-left corner of said first image.

16. The system of claim 13, wherein said second corner is an upper-right corner of said first image.

17. The system of claim 13, wherein said registered image further includes at least one registered point that is not a corner of said first image.

18. The system of claim 13, wherein the second area of WTC that is identified by the second color is a different area of WTC than the first area of WTC that is identified by the first color.

* * * * *